United States Patent [19]
Werner

[11] Patent Number: 5,651,722
[45] Date of Patent: Jul. 29, 1997

[54] MACHINE AND METHOD FOR WORKING BUTT WELD SEAMS ON BAND

[75] Inventor: Heine Werner, Ermengerst, Germany

[73] Assignee: George Kesel GmbH & Co. KG, Kempten, Germany

[21] Appl. No.: 651,711

[22] Filed: May 21, 1996

[30] Foreign Application Priority Data

Jun. 28, 1995 [DE] Germany ............ 195 23 423.5

[51] Int. Cl.$^6$ .................................................. B24B 1/00
[52] U.S. Cl. ............................... 451/28; 451/302; 29/564; 29/33 Q; 409/140
[58] Field of Search ................ 451/302, 67, 69, 451/307; 125/11.06, 21; 409/140, 157; 76/44, 50.2; 29/564, 563, 33 A, 33 Q

[56] References Cited

U.S. PATENT DOCUMENTS

| 3,758,944 | 9/1973 | Berg | 409/157 |
|---|---|---|---|
| 4,450,608 | 5/1984 | Balazs et al. | 29/33 Q |
| 4,546,815 | 10/1985 | Fischer | 451/302 |
| 4,594,815 | 6/1986 | Mickelson et al. | 451/302 |
| 4,944,080 | 7/1990 | Blumbach et al. | 409/140 |
| 5,379,510 | 1/1995 | Berge | 29/564 |

FOREIGN PATENT DOCUMENTS 2029738  3/1980  United Kingdom ............ 451/69

Primary Examiner—Robert A. Rose
Assistant Examiner—George Nguyen
Attorney, Agent, or Firm—Notaro & Michalos P.C.

[57] ABSTRACT

A machine for working the butt weld seam of a band belt, preferably having a toothed edge, includes various stations disposed successively along a feed path. The stations are a milling device, a grinding device, two ridge milling devices and a band advance device. In the milling device the welding beads are milled off on both broad sides of the band belt to form flat bases which are subsequently surface-ground in the grinding device. The succeeding milling device removes the ridge on the back of the band belt and the other milling device removes the ridge in the toothed space. The milling device for the toothed edge comprises a sensing element which is guided along a tooth of a template corresponding to the tooth space contour or another tooth space of the same band belt. The machine operates automatically under program control and achieves, without impairment of the welding seam, clean-right-angled plane faces, accurate to the required dimensions on the band belt, as well as a removal of the ridges on the narrow faces of the band belt, without damaging the saw tooth.

15 Claims, 4 Drawing Sheets

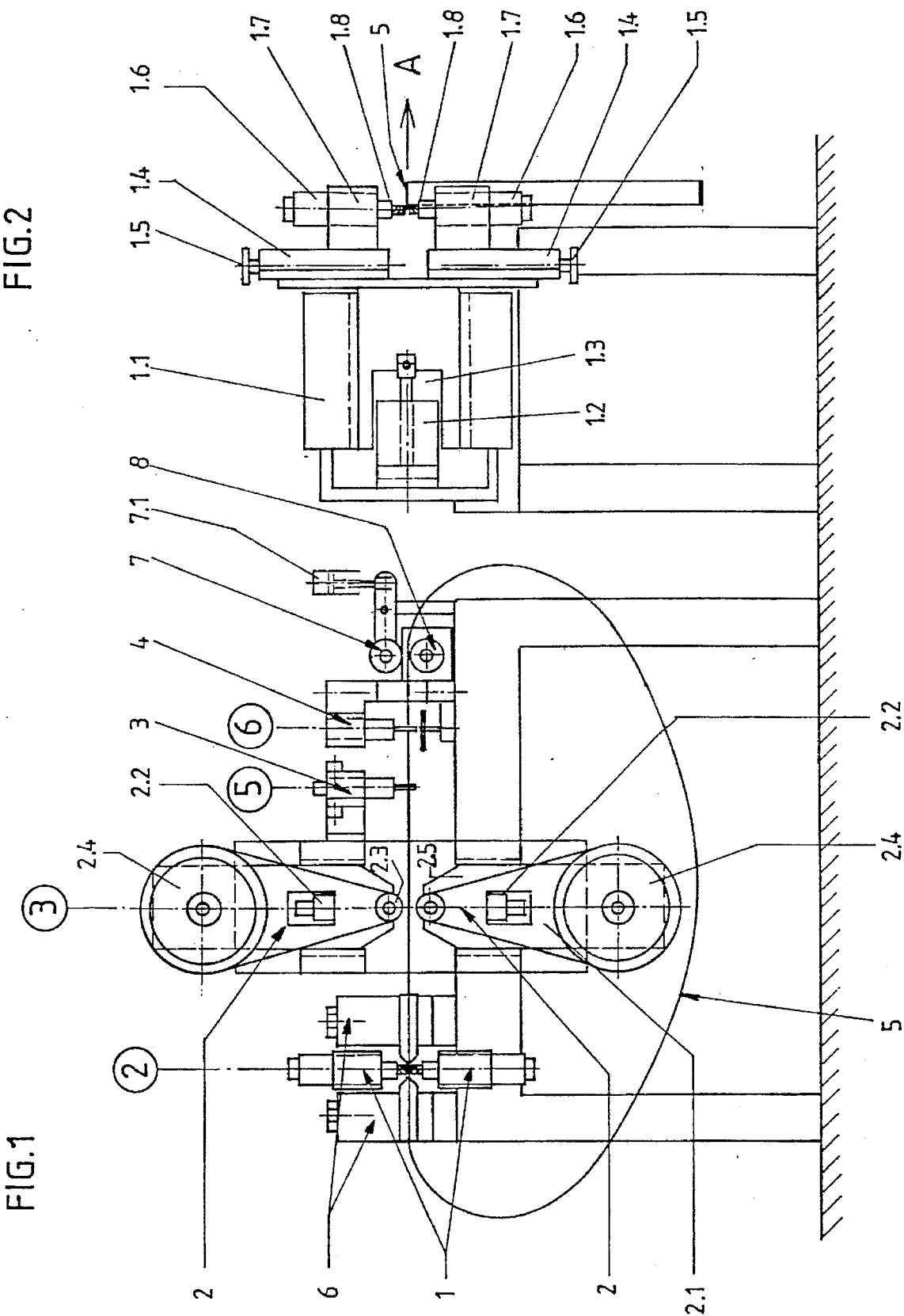

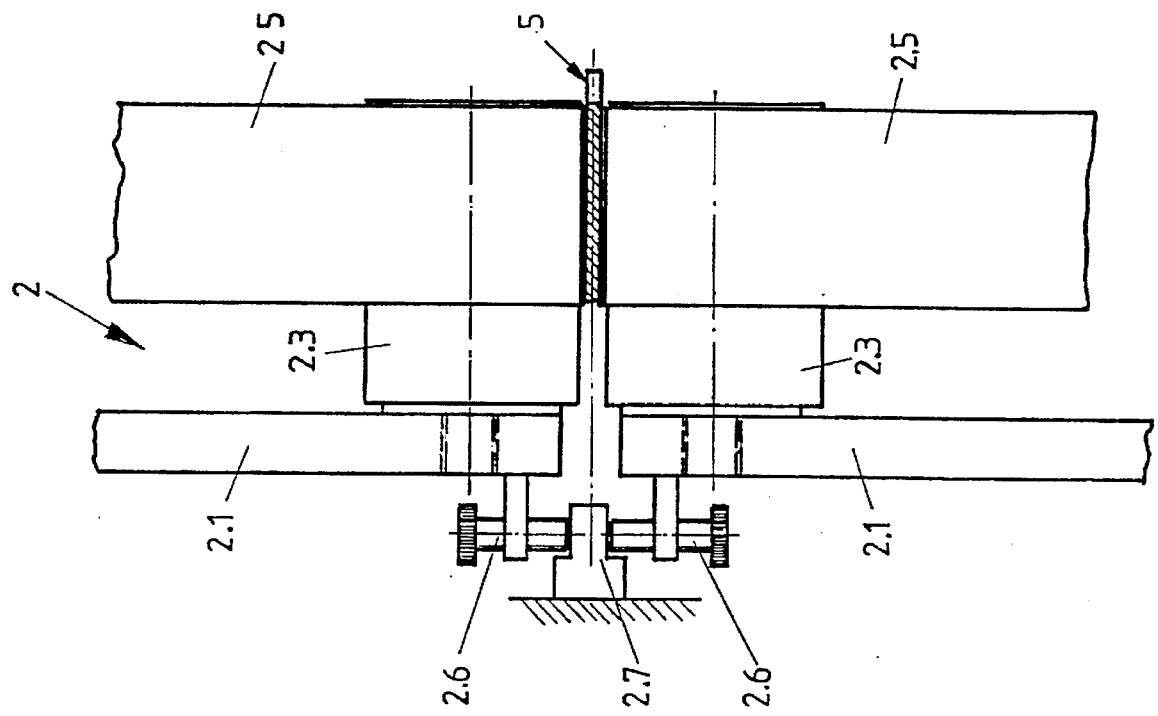
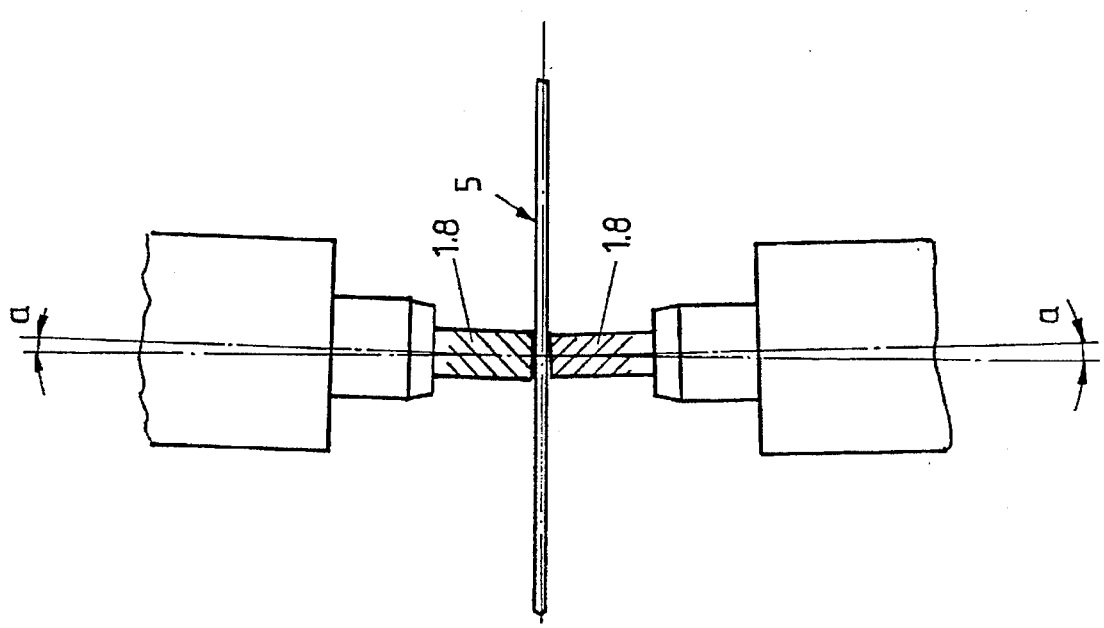

MACHINE AND METHOD FOR WORKING BUTT WELD SEAMS ON BAND

FIELD AND BACKGROUND OF THE INVENTION

The present invention relates to a method for working butt weld seams on band belts, in particular saw belts, in which a welding bead which protrudes beyond the belt contour on both broad surfaces and at opposite narrow faces of the belt, are at least partially removed by grinding.

Steel band belts, in particular saw belts for band saws are required in a great variety of circumferential lengths. The belt pieces, cut from a band supply to the required length, are connected at their ends by a butt weld seam. The welding bead must subsequently be removed at the broad sides as well as also at the narrow faces of the band belt. This is currently carried out manually by moving the band belt back and forth on a grinding disk, which is most often stationary, until the welding bead is ground off on a broad side. The band belt must subsequently be twisted in order to perform the same work on the other broad side. The ridges are subsequently also ground off on the narrow faces, with grinding in a tooth space of the saw belt requiring a great deal of attention and skill. When grinding the broad sides the welding seam can be heated to an impermissible degree when too high a pressure is applied, leading to a loss in strength which can cause dangerous tearing of the saw belt while in use.

SUMMARY OF THE INVENTION

The invention addresses the problem of developing a method and a machine operating according to the method, in order to automate the removal of the welding bead with simultaneous simple manipulation of the band and short working time, while attaining clean right-angled plane surfaces which are accurate to the required dimensions.

This problem is solved with a method comprising tightly clamping the band on both sides of the welding seam, simultaneously removing portions of the welding seem which projects from both broad surfaces using a coarse operation to produce a low residual base, in particular by milling the protruding welding seam, loosening the clamping of the belt, transporting the belt using a motorized drive into a grinding station and simultaneously surface-grinding both broad sides or surfaces of the belt in a second working step. A further object of the present invention is to provide a machine for practicing the method.

Although the main field of application of the invention relates to band belts, it is understood that the annular form is not an absolute requirement and the welding seams of finite band segments, welded together from single pieces can be worked according to the invention.

Heat developed in the seam is low by dividing the process into a first ridge removal step, for example, a rough-work stripping step, in particular a milling procedure, in which both broad sides of the band belt are milled simultaneously, and a succeeding grinding step, in which again both broad sides are surface-ground in a fine working procedure. The surface grinding is also highly precise. Of the welding-bead ridges only a base of approximately 0.02 mm height remains after the first milling procedure. This base can subsequently be removed in a single pass of the band belt. In a simplified implementation the two ridges which are still to be removed at the edge faces of the band belt, can subsequently be removed manually. But according to an advantageous embodiment of the method according to the invention, the front and rear ridges of the belt are milled off after the base milling of the welding bead and preferably after the surface-grinding of its broad sides, by sequentially transporting the belt through two further milling stations. In one, the rear ridge and in the other, the front ridge, are milled off. As a rule the front ridge of a saw belt is toothed. In this fully automatic method thus three milling stations and one grinding station are present and it is essential that in at least one, and preferably two of these stations, the belt is held at rest while the tools move along the belt and in the two other stations the tools are stationary and the belt is advanced past the tools at a given rate. In the region of the work stations the upper strand of the band belt is preferably guided horizontally. The clamping mechanism with the broadside milling device is disposed at the entrance of the machine and at the exit the band advance drive is provided. Since the working tools are stationary in the individual stations, the individual working procedures can be program controlled, the only requirement being that the welding seam is precisely positioned for the start of the procedure. This can be carried out manually with the aid of, for example, a light marking but can also be accomplished automatically by determining optically the width of the welding seam at the time the band belt is taken into the machine so that the control for the advance drive precisely positions the center of the welding seam in the particular work stations.

The machine according to the invention for working butt weld seams on band belts comprises a clamping device, a milling device, a grinding device and a band advance device. Each of these devices has a running gap for the band belt, all running gaps being aligned linearly in a horizontal plane, and at least one of these devices being implemented to be mirror-symmetrical with respect to the running gap. Both sides of the running gap have at least approximately identical tools, and the tools of the devices project from the machine frame so that below them in the perpendicular region of the running gap, a free space which is accessible from the front is formed for the lower slack strand of the band belt. Preferably the tools that have the greatest constructional height are approximately disposed at the center of the machine. Since the lower strand of the band belt droops lowest in the middle, this arrangement also permits the working of small band belts.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The invention will be described in further detail in conjunction with the drawings which depict an embodiment of the invention. In the drawings:

FIG. 1 is a schematic front view of the band belt working machine;

FIG. 2 is a sectional view approximately in the transverse plane 2 of FIG. 1;

FIG. 3 is a sectional view approximately in the transverse plane 3 of FIG. 1;

FIG. 4 is a front view of the milling tools of the milling device 1, shown on an enlarged scale;

DESCRIPTION OF THE PREFERRED EMBODIMENT

Figure 8:
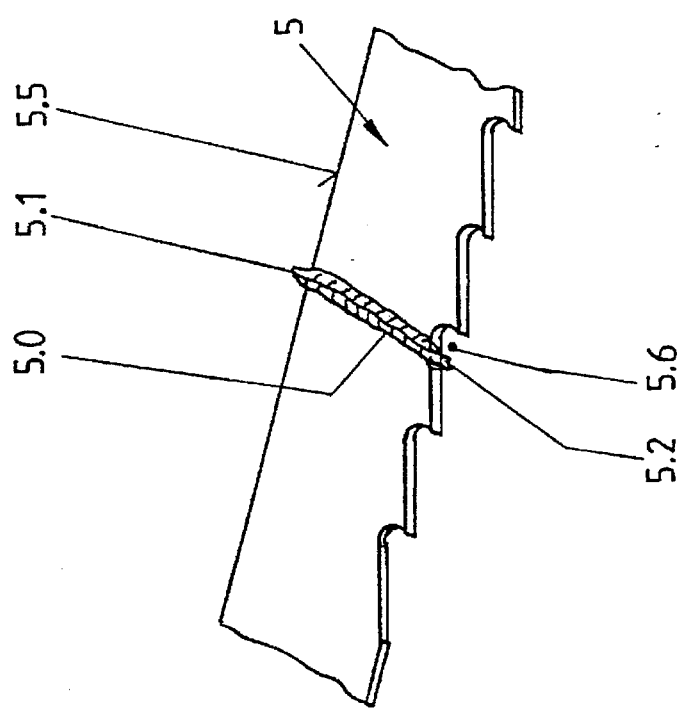
FIG. 8 is a perspective view of the band belt with butt weld seam before being worked.
Figure 10:
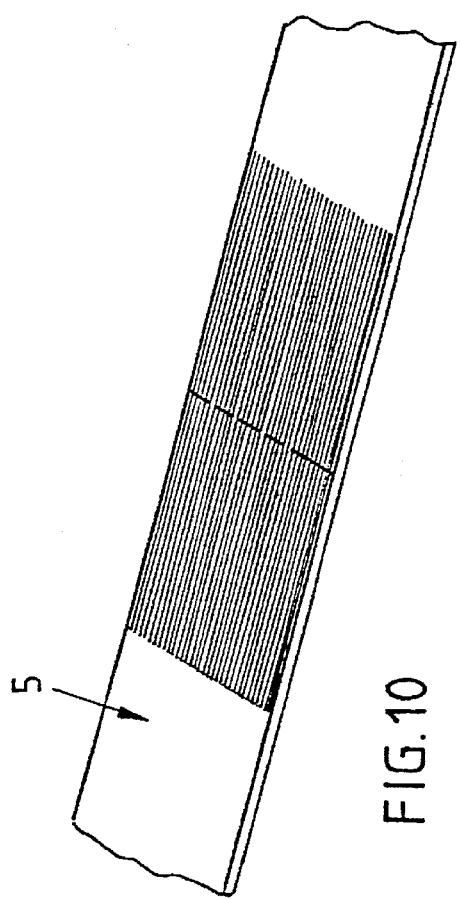
FIG. 10 is a view like FIG. 8 of the region of the welding seam after final working.

The band belt working machine comprises a first milling station 1 between two clamping devices 6, a grinding station 2, two further milling stations 3, 4 as well as a band advancing device 7, 8; all disposed one behind the other along a feed path. The clamping devices 6, the first milling device 1, the grinding device 2 and the band advance device 7, 8 define running gaps arranged in a horizontal plane and aligned one with the other. Into this running gap a saw band belt 5 is inserted from the front of the machine frame and the upper belt strand extends horizontally. The welding seam 5.0 of the band belt 5 (see FIG. 8) is centrally positioned with the aid of a light marking (not shown) between the two clamping devices 6 and consequently is oriented transversely to the two mill cutters 1.8 (see. FIG. 2) of the first milling station or device.

The milling device 1 comprises a horizontal carriage 1.1 which is moved back and forth in the transverse direction by a linear drive or cylinder 1.2. Piston rod 1.3 of cylinder 1.2 is connected to a fixed machine frame column, and the cylinder 1.2 is connected to the carriage 1.1. On the front face of the carriage 1.1 two vertical linear carriages 1.4 with feed wheels 1.5 for consoles 1.7 are provided which carry milling motors 1.6 and mill cutters 1.8, driven by motors 1.6. The mill cutters 1.8 are implemented so as to cut transversely and radially. Their axes are in a band-parallel longitudinal plane and are, as shown in FIG. 4, disposed in this plane so as to be oblique by a small angle a so that the welding seam which is milled to a base height receives trapezoidal slopes. The remaining base 5.3 according to FIG. 9 therefore has no angular end edges but rather a smooth running-out 5.4. This considerably favors the subsequent surface grinding step.

Each of the clamping devices 6 comprises a vise whose clamping jaws extend into close proximity to the path of motion of the mill cutters 1.8.

The grinding device 2 shown in FIG. 3, comprises two vertical feed carriages 2.1 with contact rollers 2.3 facing the broad sides of the upper strand of the band belt 5, and drive wheels 2.4 spaced away from the belt and the contact rollers 2.3 (FIG. 1). A grinding belt 2.5 is wrapped around each set of rollers formed by one contact roller 2.3 and a drive wheel 2.4. The carriages 2.1 include finely-adjustable stop bolts 2.6 which cooperate with a stop 2.7 that is stationary on the machine frame (FIG. 3). The drive wheels 2.4 are pivotably supported on their carriages 2.1 in the vertical plane. The pivot angle controls the grinding belt alignment which must be flush with the contact roller 2.3.

Figure 5:
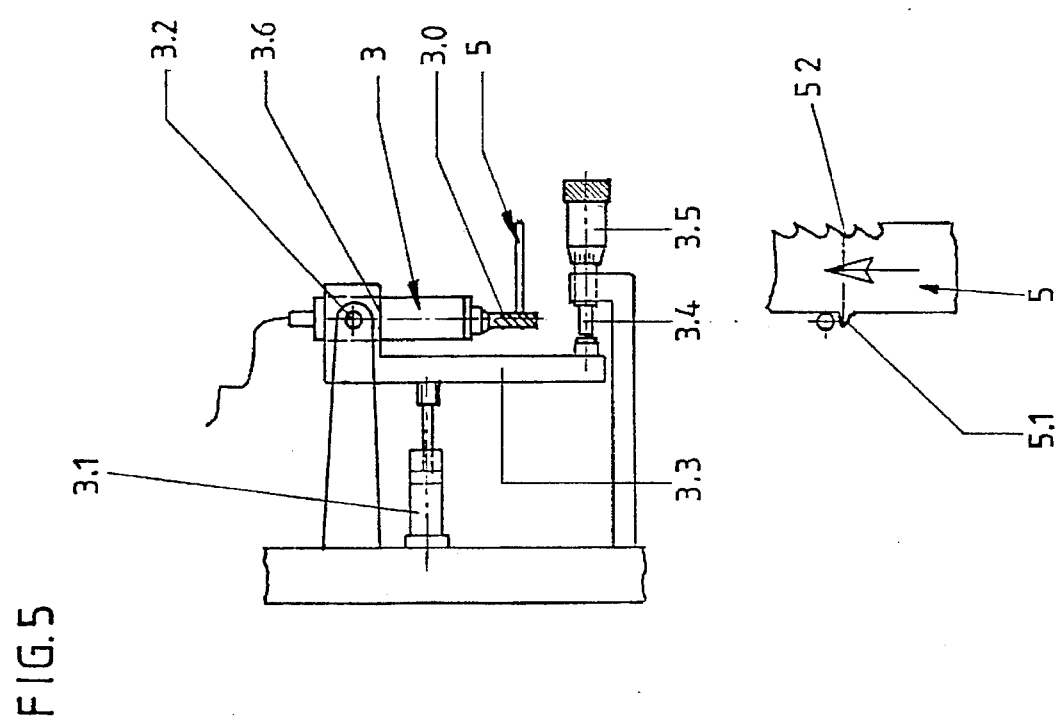
FIG. 5 is a schematic cross sectional view through a first further milling station in plane 5 of FIG. 1.

As shown in FIG. 5, the grinding device 2 is succeeded in the feed path by a first ridge milling device 3 which comprises a radial mill cutter 3.0 with perpendicular axis whose driving motor is fastened in a receptacle 3.6 with support arm 3.3 which is suspended so as to be pivotable about a horizontal longitudinal axis 3.2 on the machine frame. A pressure means cylinder 3.1 pivots the mill cutter 3.0 until the support frame 3.3 is in contact with a stop 3.4 which is adjusted by means of a micrometer screw 3.5 to bring the cutter into contact with the back edge 5.5 of the band belt 5 (see FIG. 8).

Figure 7:
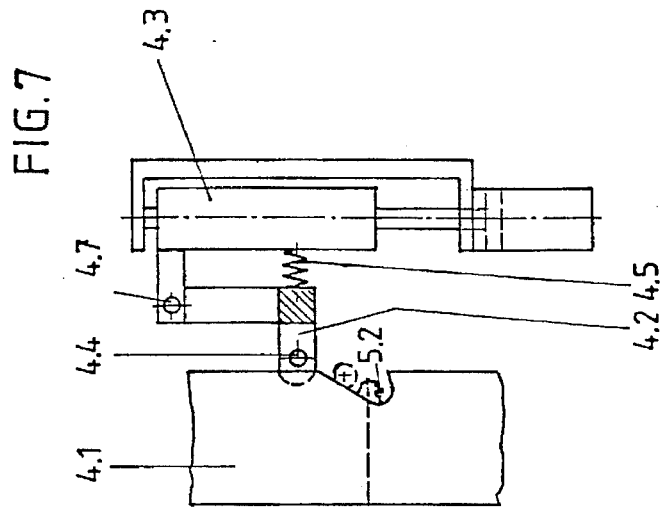
FIG. 7 is a top view onto the further milling station of FIG. 6.
Figure 6:
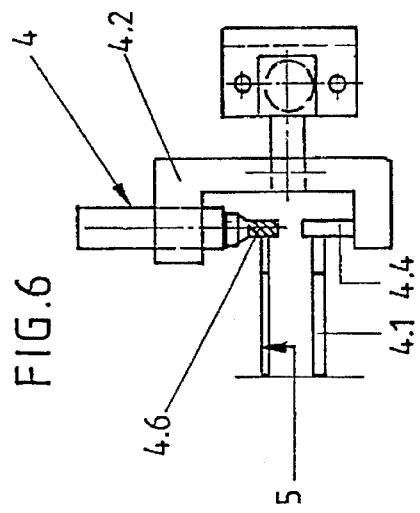
FIG. 6 is a cross section through a second further milling station in plane 6 of FIG. 1, seen from the right.

After the grinding procedure in the grinding device 2 has been completed the band advance device 7, 8, which was operating at low speed, switches to fast speed and transports the welding seam to the first milling device 3. There, after switching to slow speed again, the drive 3.1 is activated so that the mill cutter 3.0 pivots to the band back 5.5 and mills off the rearwardly projecting ridge 5.1 of the band belt 5. Subsequently switching to fast speed, the band advance device moves the welding seam to the milling device 4. In the milling device 4 the welding seam residue or ridge 5.2 within a tooth space 5.6, is removed. Depending on the type of toothing of the band belt 5 the dimensions and form of these gaps 5.6 differ. For this reason, the contour to be milled must also differ. For this purpose in the embodiment depicted, a template 4.1 in FIG. 7 is used which is adjustable in the longitudinal direction and is clamped tightly in the adjusted position to the machine frame. A carrier receptacle 4.2 carries a mill cutter 4.6 which is perpendicularly oriented (FIG. 6) with a driving motor and a sensor pin 4.4. The carrier 4.2 is supported on a longitudinal carriage 4.3 so as to be pivotable about the axis 4.7 and is pressed by means of a spring 4.5 against the template 4.1. The carriage 4.3 is supported so that it can be moved back and forth in the longitudinal direction by means of a linear drive. The template 4.1 has an edge contour corresponding to the tooth space 5.6 and is vertically aligned with it.

As soon as the welding seam 5.0 of the band belt 5 is in the position in which the mill cutter 4.6 is in contact with the beginning of the tooth space 5.6 in which the ridge 5.2 is contained, the band advance is stopped and the driving of the carriage 4.3 is initiated. The mill cutter 4.6 subsequently moves along the edge of the tooth space controlled by the sensor pin 4.4 in the template 4.1. After the ridge 5.2 has been completely removed the carriage 4.3 returns to its starting position. Stops (not shown) delimit the movement of the carriage.

Since the tooth formation of a saw belt is periodically repeated, the sensor pin 4.4 can also cooperate directly with a tooth space 5.6 of the belt band 5 which acts as the template. For this purpose it is only necessary to enter the tooth spacing into the program control with which the distance of the tooth space 5.6 containing the ridge from a tooth space with identical contour is determined. The sensor pin 4.4 is then set to this distance by the mill cutter 4.6. Mill cutter 4.6 and sensor pin 4.4 operate in the same horizontal plane; they are, however, longitudinally offset from each other.

The band advance device 7, 8 (FIG. 1) comprises a pressure roller 7 which can be pressed by a pneumatic cylinder 7.1 against the band belt 5 above the driving roller 8. The advance drive is equipped with two speed stages. A fast speed serves for transferring the welding seam from one work device to the next. During surface grinding in the grinding device 2 and during the milling of the rear ridge 5.1 the band belt 5 is transported at slow speed.

Figure 9:
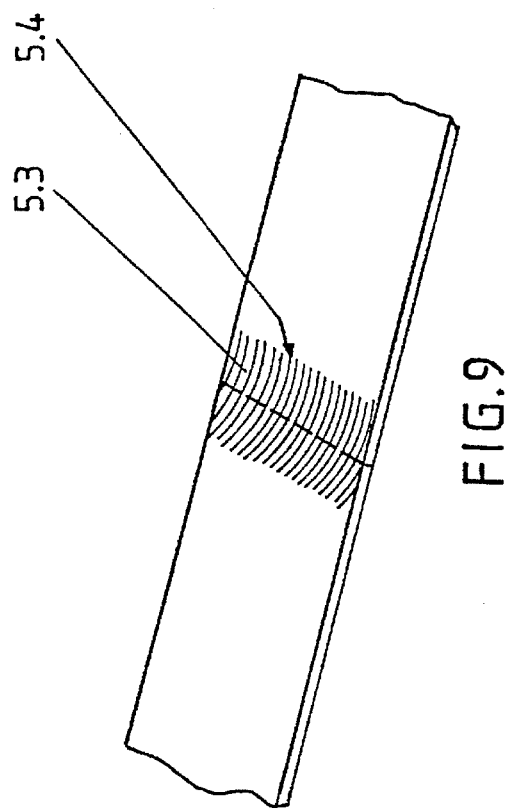
FIG. 9 is a view like FIG. 8 of the smoothed-out welding seam base generated after the first milling procedure.

From the above description it follows that the working of a band belt in four working stations takes place, fully automatically. The electronic control ensures a selection of the work positions in the particular working devices. After the band belt has been positioned manually or automatically so that the welding seam 5.0 is transversely oriented to the mill cutters 1.8 of the milling device 1, the clamping devices 6 are activated and the pressure roller 7 of the band advance device 7, 8 is pressed against the band belt 5. The end-mill cutters 1.8 start to run and the carriage 1.1 moves in the transverse direction so that the welding beads are milled off down to a base height of maximally 0.02 mm. Due to the angular positions of the milling axes a smooth running-out of the milled surface 5.3 is achieved as is shown in FIG. 9 at 5.4. After reaching the advance path set, the carriage 1.1 returns at fast speed. The clamping devices 6 are opened and the band advance 7, 8 transports the band belt 5 at fast speed until the premilled welding seam has reached the band grinding device 2. It is possible to select on the electronic control the time at which the two grinding carriages 2.1 are brought in. The band belt 5 moves in slow motion during the grinding phase. The desired length of the ground surface is preselected via the electronic control. After switching over to fast speed, the welding seam moves into the region of the first further milling device 3 where the advance device 7, 8 is again switched back to slow speed; simultaneously the drive 3.1 is actuated and the mill cutter 3.0 removes the ridge 5.1 on the rear face 5.5 of the band. As soon as this step is completed, switching to fast speed takes place again until the ridge 5.2 contained in the tooth space 5.6 arrives in the region of the further milling device 4 where this ridge is also removed.

At this point the finished band belt 5 can be removed from the machine.

While a specific embodiment of the invention has been shown and described in detail to illustrate the application of the principles of the invention, it will be understood that the invention may be embodied otherwise without departing from such principles.

What is claimed is:

1. A method for working a butt weld seam on band belt in which a welding bead of the seam projects beyond a contour of the belt on opposite broad sides and on opposite narrow faces of the belt, the method comprising:
    clamping the band belt tightly on opposite sides of the seam;
    simultaneously removing, through a coarse working, the welding-bead projections on both broad sides of the band belt, down to a residual base in a first working step;
    loosening the clamping of the band belt;
    thereafter transporting the belt by means of a motorized advance drive, into a grinding station; and
    in the grinding station, surface-grinding both broad sides of the belt simultaneously to remove the residual base in a second working step.

2. A method as stated in claim 1, including moving the belt at constant speed through the grinding station during the second working step.

3. A method as stated in claim 1, including, after the first working step, transporting the belt successively through two edge milling devices, milling off a projection of a rear one of the narrow faces in one of the edge milling devices and milling off a projection of a front one of the narrow faces in the other edge milling device.

4. A method as stated in claim 1 including, starting from the clamping of the band belt and after loosening the clamping, operative the advance drive to move the welding seam of the band belt at fast speed up to the grinding station and, thereafter automatic switching the advance device to slow speed for moving the belt at slow speed through the grinding station.

5. A method as stated in claim 3, including moving the band belt in one of the two milling devices at slow speed past a milling tool in the one edge milling device, and in the other of the two edge milling devices, stopping the belt while a milling tool of the other edge milling device which is supported on a longitudinally movable carriage is guided at the front one of the narrow faces of the band belt on a selected path and a sensing element disposed on the carriage senses a contour corresponding to the selected path on a template for guiding the carriage.

6. A method as stated in claim 5, wherein the sensing element senses the band belt itself at a site which is offset from the site to be milled by a selected spacing, the band belt forming the template.

7. A machine for working a butt weld seam on band belt in which a welding bead of the seam projects beyond a contour of the belt on opposite broad sides and on opposite narrow faces of the belt, the machine comprising:
    a machine frame defining a feed path for at least an upper strand of the band belt;
    a clamping device, a milling device, a grinding device and a band advance device, each of said devices having a running gap positioned at said feed path for the band belt, all of said running gaps being oriented linearly with each other in a horizontal plane;
    at least one of said devices being mirror-symmetrical with respect to the feed path and the running gap thereof, and having on both sides of the running gap at least substantially identical working tools, said tools extending on said machine frame so that underneath said tools, said frame defines a free space which is accessible from a front of the frame, for a lower drooping strand of the band belt.

8. A machine as stated in claim 7, wherein the clamping device comprises two pairs of clamping jaws between which the milling device, with an upper and lower mill of the milling device cutter, is disposes, drives connected to said mill cutters, said drives being mounted on a common transverse carriage for movement of said drives back and forth transversely to a direction of motion of the band belt on the feed path, and a linear drive connected to said carriage for movement of said carriage.

9. A machine as stated in claim 8, wherein the milling cutters are at least transversely cutting end-mill cutters, and means for mounting the cutters so as to be inclined at a small angle to the feed path relative to a perpendicular transverse plane to the feed path.

10. A machine as stated in claim 7, wherein the grinding device comprises two substantially identical grinding tools which are symmetrical with respect to the running gap, each grinding tool comprising perpendicularly oriented contact and drive wheels and a grinding belt wrapped around said wheels, each grinding tool being mounted on a perpendicularly guided carriage with a feed drive and finely-adjustable stop means for engaging each carriage.

11. A machine as stated in claim 10, wherein the drive wheels have axes and drive motors which are disposed with respect to the horizontal, so as to be pivotable with a slope that is adjustable.

12. A machine as stated in claim 7, comprising a rear ridge milling device on the feed path for a back narrow face of the belt and a front ridge milling device for a toothing front narrow face of the belt, the front ridge milling device comprising a carriage guided parallel to the running gap and provided with a linear drive, a carrier on the carriage which is movable transversely to a direction of advance of the carriage, a spring which is preloaded in the direction of the feed path for the band belt, and a motor-driven end-mill cutter and a sensing element both supported on the carrier, the end-mill cutter being guided during movement of the carriage along an edge of a template corresponding to a nominal contour of the front narrow face of the band belt in the region of a welding bead ridge, while the end-mill cutter carries out the same motion as the sensing element.

13. A machine as stated in claim 12, wherein the carrier is a linearly movable cross slide on which one of the sensing element and the end-mill cutter is mounted at least at approximately the same level, and is adjustable in the direction of motion of the carriage, with the sensing element sensing a tooth space of the band belt while simultaneously the end-mill cutter mills off the ridge in another toothed space of the contour of the belt.

14. A machine as stated in claim 8, wherein the two mill cutters of the milling device are implemented so as to cut transversely and radially, and are disposed with a front thereof facing the band belt and on vertical carriages, and with axes thereof disposed in a vertical longitudinal plane parallel to the direction of motion of the band belt, said longitudinal plane forming with the vertical a small angle so that a milled base of the welding seam has on one side, a smooth run-out on the band belt.

15. A machine as stated in claim 14, wherein the milling device is structural to work the seam so that the milled bases, milled on both sides of the welding seam, are inclined downwardly in the direction of motion of the band belt.

* * * * *